(12) United States Patent
McKinney et al.

(10) Patent No.: US 12,202,685 B2
(45) Date of Patent: Jan. 21, 2025

(54) SERVO-CONTROLLED MACHINE LINE

(71) Applicant: Belvac Production Machinery, Inc., Lynchburg, VA (US)

(72) Inventors: Larry D. McKinney, Lynchburg, VA (US); Dennis E. Green, Lynchburg, VA (US); Jeffrey L. Shortridge, Lynchburg, VA (US); Ric Keesee, Lynchburg, VA (US); Stephen M. Packer, Lynchburg, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 251 days.

(21) Appl. No.: 17/865,053

(22) Filed: Jul. 14, 2022

(65) Prior Publication Data
US 2023/0024710 A1     Jan. 26, 2023

Related U.S. Application Data

(60) Provisional application No. 63/222,178, filed on Jul. 15, 2021.

(51) Int. Cl.
*B65G 47/90* (2006.01)
*B65G 29/00* (2006.01)

(52) U.S. Cl.
CPC .......... *B65G 47/904* (2013.01); *B65G 29/00* (2013.01); *B65G 2201/0235* (2013.01); *B65G 2207/30* (2013.01)

(58) Field of Classification Search
None
See application file for complete search history.

(56) References Cited

U.S. PATENT DOCUMENTS

| | | |
|---|---|---|
| 5,074,399 A | 12/1991 | Kettle |
| 5,075,399 A | 12/1991 | Ahmed |
| 5,799,525 A | 9/1998 | Johnson |
| 5,941,109 A | 8/1999 | Johnson |
| 6,151,939 A | 11/2000 | Hanna |
| 6,675,951 B2 | 1/2004 | Preti |

(Continued)

FOREIGN PATENT DOCUMENTS

| | | |
|---|---|---|
| CN | 107253609 | 10/2017 |
| EP | 2082979 A1 | 7/2009 |

(Continued)

OTHER PUBLICATIONS

International Search Report and Written Opinion for International Application No. PCT/US2022/037177, mailed Oct. 26, 2022, p. 11.

*Primary Examiner* — William R Harp
(74) *Attorney, Agent, or Firm* — Nixon Peabody LLP

(57) ABSTRACT

Systems and methods are disclosed for controlling the rotation of turrets with servo motors within a machine line used in the shaping of articles. Error conditions can be detected using the servo motors for resolving issues with the machine line. Control of the turrets by the servo motors allows for each turret to be rotated relative to the other turrets independently for resolving the issues. Absolute encoders are used to return the servo motors and their respective turrets back to being aligned with a virtual axis for synchronous rotation of the turrets within the machine line, despite the turrets not being mechanically coupled together by a series of gears.

16 Claims, 6 Drawing Sheets

(56) References Cited

U.S. PATENT DOCUMENTS

| | | | |
|---|---|---|---|
| 8,096,156 B2 | 1/2012 | Olson | |
| 8,297,322 B2 | 10/2012 | Monzel | |
| 8,511,478 B2 | 8/2013 | Terzini | |
| 8,590,358 B2 * | 11/2013 | Frattini | B21D 51/2615 198/572 |
| 8,668,074 B2 | 3/2014 | Davidson | |
| 8,733,146 B2 * | 5/2014 | Babbitt | B21D 21/00 72/94 |
| 8,752,693 B2 | 6/2014 | Voth | |
| 8,800,248 B2 | 8/2014 | Imatani | |
| 8,807,325 B2 | 8/2014 | Olson | |
| 8,844,708 B2 | 9/2014 | Winter | |
| 8,978,873 B2 * | 3/2015 | Shimomura | B67C 7/004 198/464.1 |
| 9,027,733 B2 | 5/2015 | Coates | |
| 9,233,820 B2 | 1/2016 | Bernhard | |
| 9,302,856 B2 | 4/2016 | Papsdorf | |
| 9,340,364 B2 | 5/2016 | Papsdorf | |
| 9,371,195 B2 | 6/2016 | Papsdorf | |
| 9,610,744 B2 | 4/2017 | Sato | |
| 9,694,988 B2 | 7/2017 | Clüsserath | |
| 9,751,178 B2 * | 9/2017 | Kameta | B23Q 11/0092 |
| 9,950,875 B2 | 4/2018 | Walter | |
| 9,953,809 B2 | 4/2018 | Weng | |
| 9,969,117 B2 | 5/2018 | Hoellriegl | |
| 10,022,775 B2 | 7/2018 | Brechling | |
| 10,035,620 B2 | 7/2018 | Pau | |
| 10,106,335 B2 | 10/2018 | Laverdiere | |
| 10,265,906 B2 | 4/2019 | Gerhards | |
| 10,391,541 B2 | 8/2019 | Lee | |
| 10,450,179 B2 | 10/2019 | Sorbi | |
| 10,622,867 B2 | 4/2020 | Tamura | |
| 10,662,000 B2 | 5/2020 | Grazioli | |
| 10,691,101 B2 | 6/2020 | Langwieser | |
| 10,739,705 B2 | 8/2020 | Stowitts | |
| 10,752,448 B2 | 8/2020 | Yoder | |
| 10,807,297 B2 * | 10/2020 | Santais | B29C 49/4205 |
| 10,890,891 B2 | 1/2021 | Santais | |
| 10,960,596 B2 | 3/2021 | Pasquier | |
| 2003/0042442 A1 | 3/2003 | Schill | |
| 2012/0085071 A1 | 4/2012 | Hahn | |
| 2014/0253718 A1 | 9/2014 | Leitzen | |
| 2018/0164719 A1 | 6/2018 | Stowitts | |
| 2019/0061225 A1 | 2/2019 | Pasquier | |
| 2019/0111591 A1 | 4/2019 | Bysick | |
| 2019/0337732 A1 | 11/2019 | Yoder | |
| 2020/0231318 A1 | 7/2020 | Habenschaden | |
| 2021/0354192 A1 | 11/2021 | Green | |
| 2022/0305688 A1 | 9/2022 | Mammolenti | |

FOREIGN PATENT DOCUMENTS

| | | |
|---|---|---|
| JP | 2007083252 | 4/2007 |
| JP | 2012060830 A | 3/2012 |
| WO | WO2014206978 | 12/2014 |

* cited by examiner

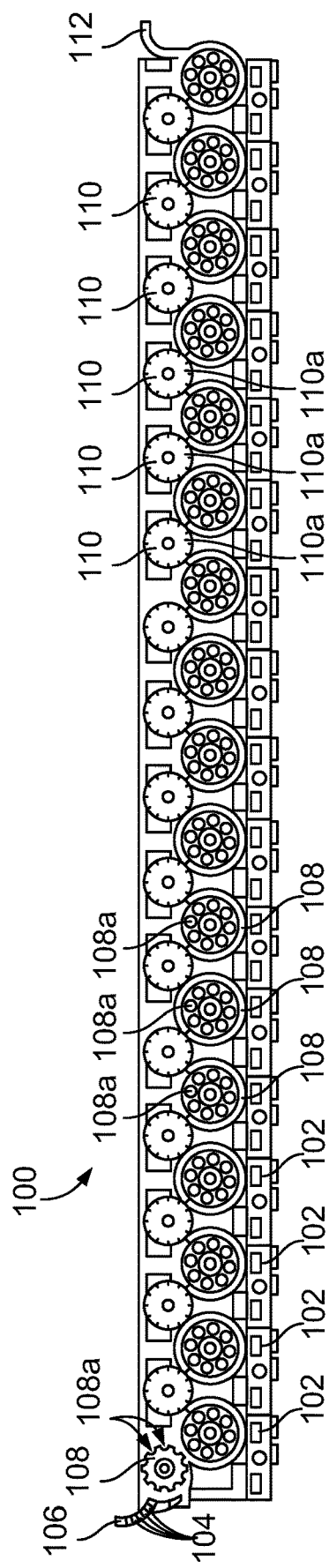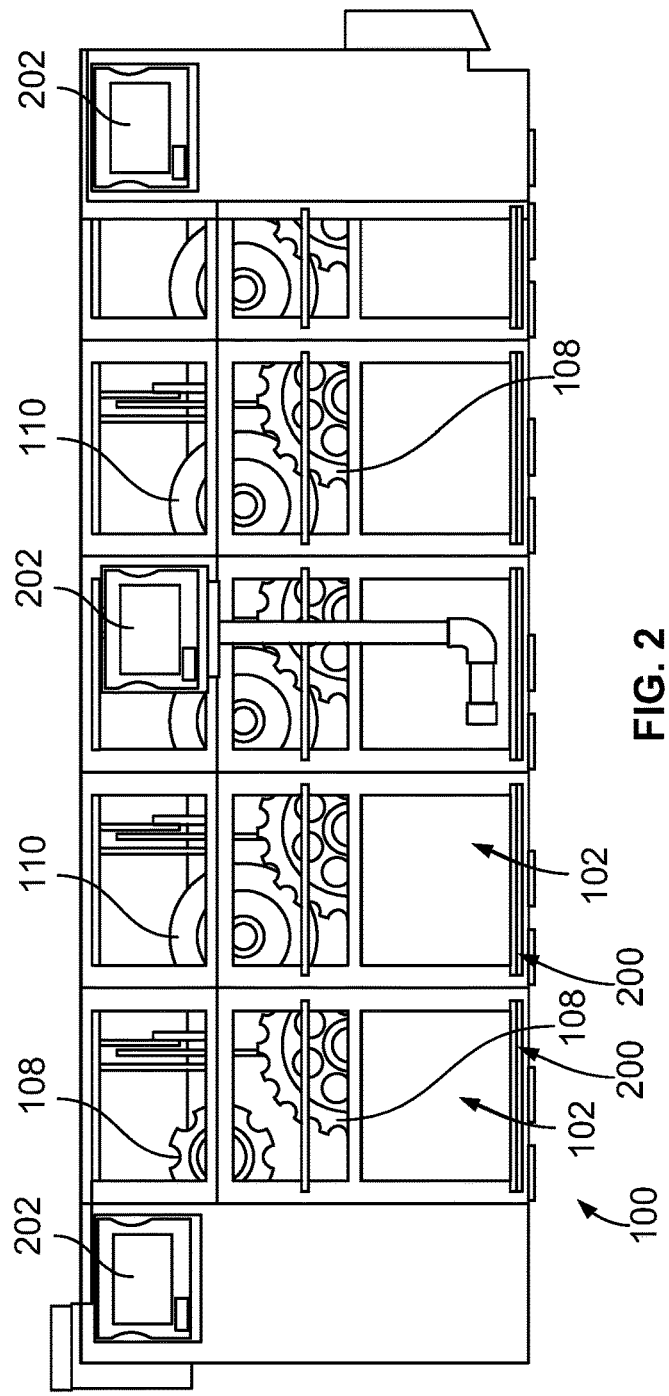

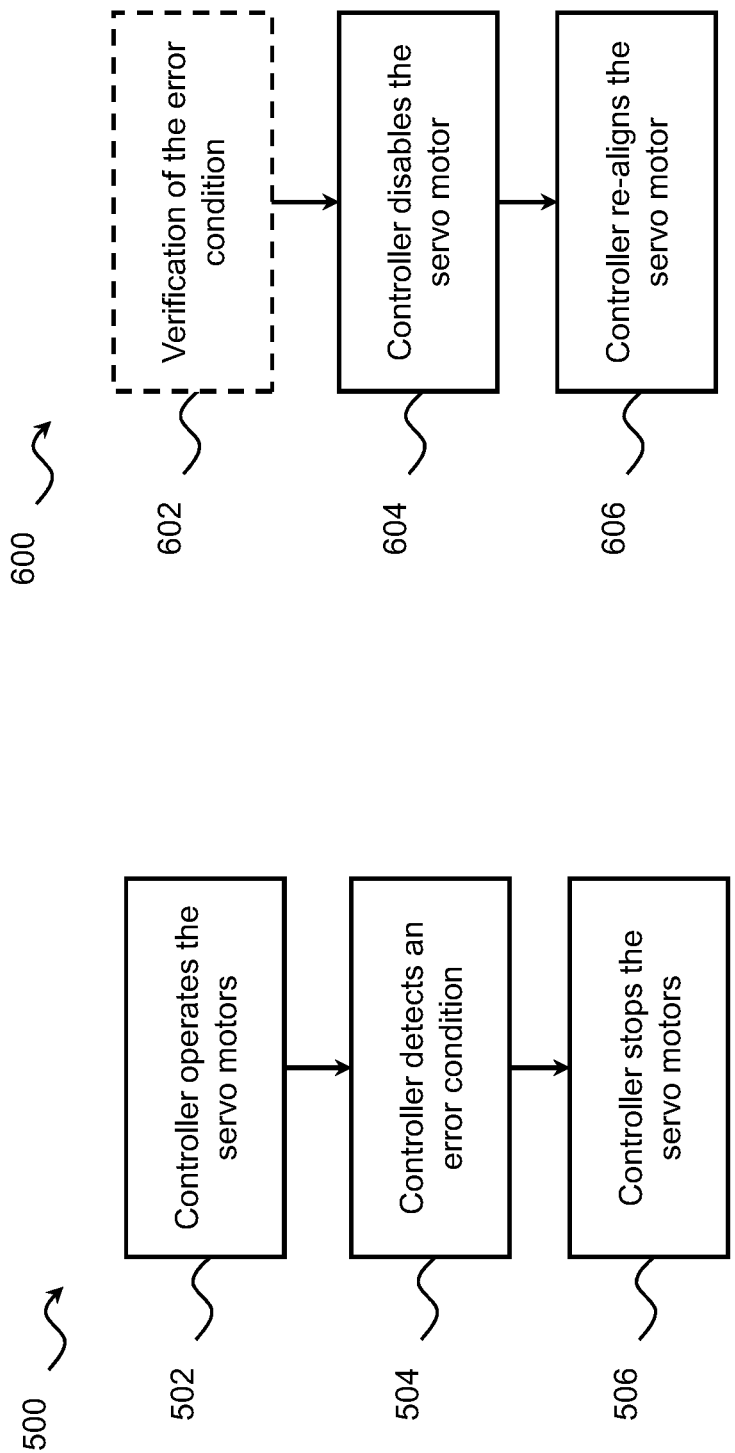

SERVO-CONTROLLED MACHINE LINE

CROSS-REFERENCE TO RELATED APPLICATIONS

This application claims the benefit of and priority to U.S. Provisional Patent Application No. 63/222,178, filed on Jul. 15, 2021, the content of which is incorporated herein by reference in its entirety.

FIELD

The present invention relates generally to the field of equipment for article processing systems. More specifically, the invention relates to a servo-controlled machine line for processing articles, such as containers or container preforms, and the corresponding methods of operating the same.

BACKGROUND

Conventional machine lines for forming containers include a series of modules on which other components are mounted, including turrets for transferring containers or container preforms between modules and turrets for performing a working operation on the containers. The turrets within the series of modules of the conventional machine lines are driven by a motor that drives a series of gears connecting the turrets throughout the machine line together. An exemplary problem caused by such an arrangement includes the backlash that occurs as the slack within the gears is taken up during the starting or the stopping of the rotation of the gears, which may be enhanced by the high speed at which the gears rotate. Another exemplary problem caused by such an arrangement is the inability to rotate only one turret within the series of turrets because each turret is connected to the series of turrets through the series of gears. Yet another exemplary problem caused by such an arrangement is the limited ability to detect jams or other issues within the series of turrets and the inability to detect a general location of the issue within the series of turrets.

Accordingly, it would be desirable to have a machine line formed of a series of modules that does not suffer from one or more of the above disadvantages, along with the associated processes for operating such a machine line.

SUMMARY

One exemplary embodiment of the invention relates to a process including the steps of operating, by a controller, a series of servo motors synchronously within a series of modules. Each module of the series of modules includes a respective servo motor of the series of servo motors that rotates a corresponding turret for passing articles through the series of modules or for modifying a shape of the articles. The process further includes the step of detecting, by the controller, an error condition within the series of modules. The error condition is at least one servo motor of the series of servo motors exceeding a torque threshold, a position threshold, or a combination of the torque threshold and the position threshold. The error condition indicates damage to at least one of the articles, a jam of at least one of the articles in a corresponding turret of the at least one servo motor, or a combination thereof. The process further includes the step of stopping, by the controller, the operating of the series of servo motors within the series of modules based on the detecting of the error condition by stopping each servo motor individually within the series of modules.

One aspect of the embodiment includes the error condition being the jam of the at least one article, with the process further including the step of disabling, by the controller, the at least one servo motor to allow manual rotation of the corresponding turret—separate from the series of turrets—for removing the jam of the at least one container. According to the first aspect, the process can further include the steps of aligning the series of servo motors amongst each other according to a virtual axis prior to the operating of the series of servo motors, and re-aligning, by the controller, the at least one servo motor with the virtual axis after the removing of the at least one container. According to the aspect, the process can further include the step of disabling, by the controller, one or more adjacent servo motors of the at least one servo motor to allow manual rotation of corresponding turrets of the one or more adjacent servo motors separate from the series of turrets. In which case, the process can further include the steps of aligning the series of servo motors amongst each other according to a virtual axis prior to the operating of the series of the servo motors, and re-aligning, by the controller, the at least one servo motor and the one or more adjacent servo motors with the virtual axis after correcting the error condition.

According to another aspect of the embodiment, the process further includes the step of verifying the error condition based on an encoder count associated with the module corresponding to the at least one servo motor exceeding a count threshold. The controller can perform the verifying of the error condition. Alternatively, a second controller can perform the verifying of the error condition upon receipt of the error condition from the controller. The second controller can be, for example, a controller in the servo motor.

According to a further aspect of the embodiment, the series of servo motors can come to a full stop in 4 seconds or less upon the stopping of the operating. More preferably, the series of servo motors can come to a full stop in 2.5 seconds or less upon the stopping of the operating.

According to a further aspect of the embodiment, each servo motor of the series of servo motors is coupled directly to the corresponding turret within the series of modules. A shaft of the corresponding turret can be inserted into each servo motor to couple the servo motor to the respective corresponding turret.

According to another aspect of the embodiment, each servo motor of the series of servo motors can be mechanically connected to the corresponding turret within the corresponding module by one or more gears, and the one or more gears of adjacent modules are mechanically isolated from each other.

According to a further aspect of the embodiment, each servo motor of the series of servo motors is pre-configured to have a default alignment position, and the default alignment position corresponds to a default virtual axis of the series of servo motors within the series of modules.

According to another aspect of the embodiment, one or more turrets within the series of modules have different moments of inertia.

According to yet another aspect of the embodiment, the process further includes the steps of triggering a fault, by the at least one servo motor, when the error condition is the at least one servo motor exceeding the position threshold, and re-setting, by the controller, the at least one servo motor to clear the fault after correcting the error condition. According to this aspect, after re-setting the at least one servo motor, the process can further include the step of returning the at least one servo motor to a rotational arrangement prior to the fault condition based on a virtual axis of the series of modules.

It is to be understood that both the foregoing general description and the following detailed description are exemplary and explanatory only and are not restrictive of the invention as claimed. Further, one or more of the above aspects can be combined together to form one or more additional aspects of the exemplary embodiment.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is a schematic view of a machine line that incorporates an embodiment of the present invention.

FIG. 2 is a front perspective view of part of the machine line of FIG. 1, illustrating user workstations and guard covers.

FIG. 5 illustrates a process of controlling servo motors within a machine line using a controller, in accordance with aspects of the present disclosure.

FIG. 6 illustrates a process of correcting an error condition reported within the process of FIG. 5, in accordance with aspects of the present disclosure.

DETAILED DESCRIPTION

Figure 3A:
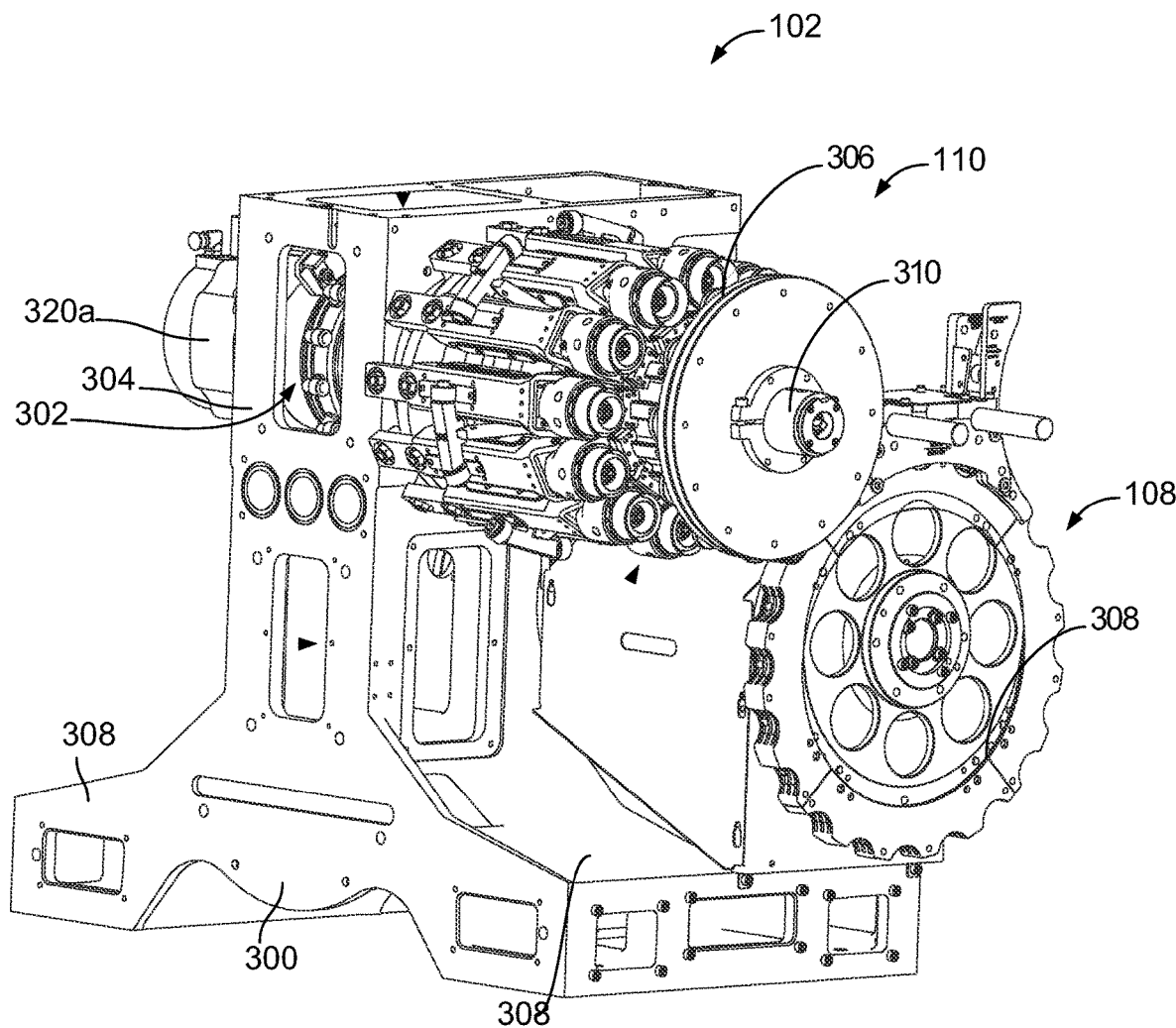
FIG. 3A is a perspective view of a module that incorporates an embodiment of the present invention within the machine line of FIG. 1.

Machine lines are used to perform various operations on articles. For example, machine lines are used to perform various working operations on container preforms for forming containers from the container preforms. The machine lines include a series of modules. Each module performs a specific operation on the article, such as a working operation or a transfer operation or both a working operation and a transfer operation. The working operation modifies the shape of the article, such that the series of working operations form, for example, a container from a container preform, or form at least part of the container from the container preform. The transfer operation transfers the articles between two modules that apply two working operations, respectively. After the container passes through the last module within the machine line, the container is discharged from the machine line. The machine line may be a recirculating machine line, a linear line, or any other type of machine line.

FIG. 1 shows an embodiment of a machine line 100 that is formed of a series of modules 102 according to one exemplary embodiment of the present disclosure. Each module 102 is configured to perform a series of transfer operations and/or working operations on an article 104, such as a container preform, that is fed through the machine line. The article 104 can be a can, any suitable food or beverage container, a jar, a bottle or any other suitable article that has applied to it a series of working operations to reconfigure the shape of the article in the process of making a final version or product from the article, such as a container or at least part of a container. When the article 104 is a container preform, the container preform has an open end, an opposing closed end, and a sidewall extending from and bridging the open end and the closed end. Alternatively, the container preform may be open at both ends. A top, lid, bottom, or other closure may be added to the container preform during an operation in the machine line 100 or at a later stage. The working operations may comprise, for example, necking, flanging, reprofiling, reforming, leak/light testing, or any other suitable working operation, when the article is a container preform. The machine line 100 may be configured to operate stages of a single working operation or any suitable combination of working operations.

In the illustrated embodiment of FIG. 1, articles 104 are fed into the machine line via an infeed mechanism 106. The articles 104 are then passed to pockets 108a in a first transfer turret 108 of the first module 102 from the left. The transfer turret 108 then passes the articles 104 to corresponding pockets 108a of another transfer turret 108 of the second module 102 from the left. Alternatively, both of the first transfer turrets 108 can be associated with the same module 102. From the transfer turret 108 of the second module 102, the articles 104 then pass to pockets 110a in a working turret 110 of a third module 102 from the left. The working turrets 110 in the machine line 100 perform one or more of the above-described working operations on the articles 104. Specifically, in the pockets 110a of each of the working turrets 110, the article 104 undergoes a working operation (e.g., a necking operation). The articles 104 continue through the machine line 100 by passing through corresponding transfer turret pockets 108a and working turret pockets 110a in the alternating transfer turrets 108 and working turrets 110, respectively. The working turrets 110 and the transfer turrets 108 and, thus, the articles 104, continuously rotate throughout the machine line 100 as the articles 104 pass from one module 102 to the next module 102. At the end of the machine line 100, the articles 104 exit the machine line 100 via a discharge mechanism or path 112.

The use of modules 102 allows for the machine line 100 to be assembled and changed to provide as many forming stages as is required and to allow for adding or reducing stages such as flanging, necking, trimming, curling, threading, and/or base reforming/reprofiling stages, which may be added and/or removed as desired.

FIG. 2 illustrates a detailed front perspective view of a portion of the machine line 100 in which module guard covers (sometimes referred to as coverings or enclosures) 200 are shown closed over each module 102, according to one non-limiting embodiment. The machine line 100 may include workstations 202 that enable an operator to control and/or monitor the machine line 100. The workstations 202 and the guard covers 200 shown are illustrative examples only.

Figure 3B:
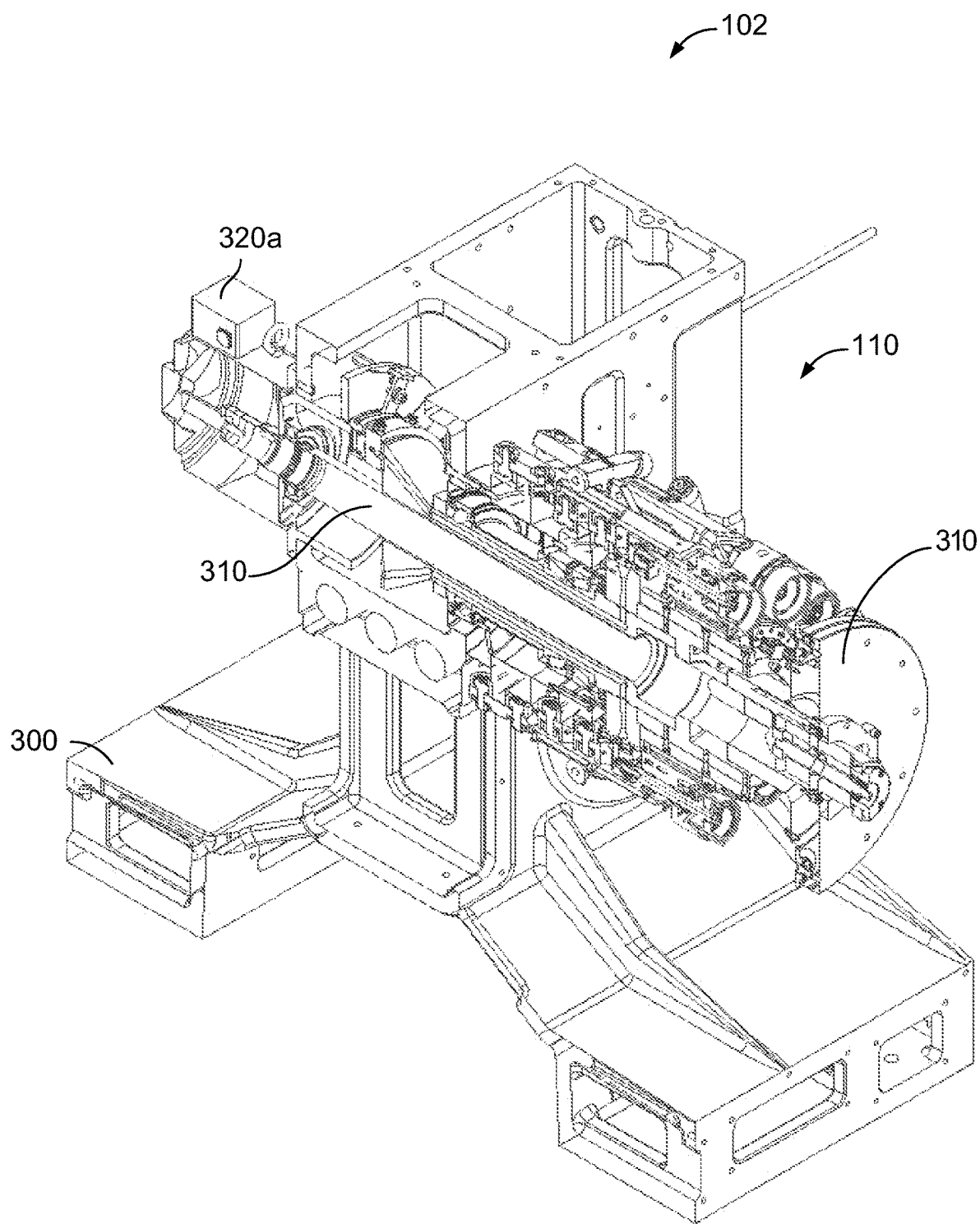
FIG. 3B is a cross-sectional view of the module of FIG. 3A.
Figure 3C:
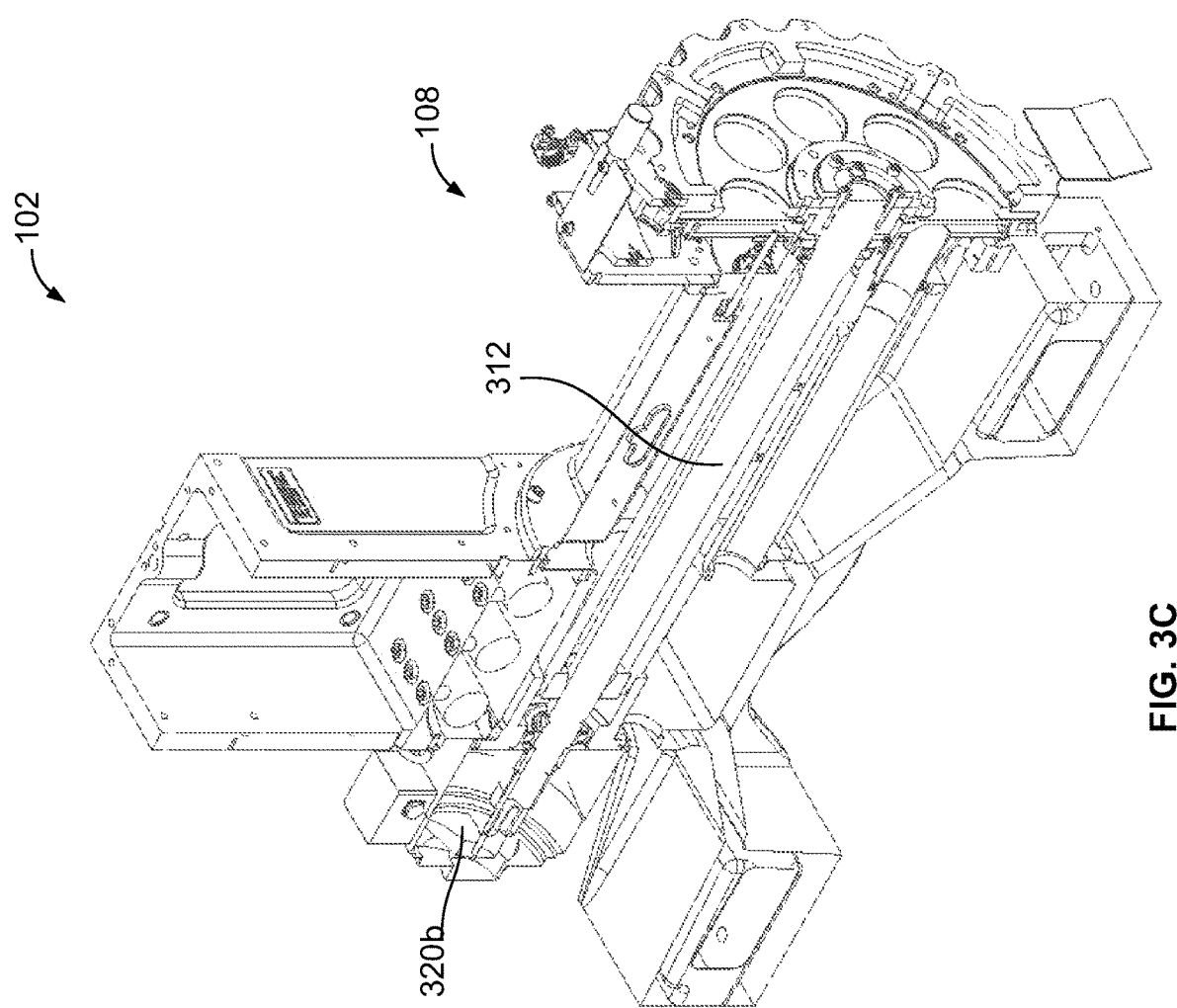
FIG. 3C is another cross-sectional view of the module of FIG. 3A.

FIGS. 3A-3C show detailed views of a representative module 102 of the series of modules 102 disclosed above, according to aspects of the present disclosure. Referring to FIG. 3A, each module 102 includes a modular and interchangeable base 300 that retains at least one turret, such as a transfer turret 108 and/or a working turret 110. As shown in FIG. 3A, the base 300 includes both a transfer turret 108 and a working turret 110

The working turret 110 may be supported at a base end portion 302 in a leg portion 304 of the base 300, as shown in FIG. 3A. Elements of the working turret 110 are known in the art and are, therefore, not discussed in detail herein. For a brief discussion, however, the working turret 110 generally includes a cantilevered working end portion 306 that applies the working operations to the articles 104 as the articles 104 pass through the working turret 110. The working turret 110 also includes a shaft 310 that connects the working turret 110 to the base 300.

The transfer turret 110 also may be supported at the base end portion 302 in the leg portion 304 of the base 300, as shown in FIG. 3A. Elements of the transfer turret 108 are known in the art and are, therefore, not discussed in detail herein. For a brief discussion, however, the transfer turret 108 generally includes a cantilevered transfer end portion 308.

Based on the foregoing description, the module 102—including the base 300, the transfer turret 108, and the working turret 110—is similar to modules with bases, transfer turrets, and working turrets in conventional machine lines. However, modules of conventional machine lines have a series of interconnected gears that rotate the transfer turrets and working turrets. In contrast, the modules 102 of the present embodiment do not require the series of connected gears. Instead, each of the modules 102 has a separate servo motor 320 that independently rotates respective transfer turrets 108 and the working turrets 110. Specifically, a servo motor 320a (FIGS. 3A and 3B) rotates the working turret 110. Further, a servo motor 320b (FIG. 3C) rotates the transfer turret 108. Based on the servo motors 320a and 320b respectively rotating the working turret 110 and the transfer turret 108, instead of a series of connected gears through the machine line 100, each of the working turret 110 and the transfer turret 108 can be rotated independently from one another and from the other working turrets 110 and transfer turrets 108 within the machine line 100. Moreover, as further discussed below with respect to FIG. 4, the working turrets 110 and the transfer turrets 108 of the same module 102 and different modules 102, including all of the modules 102 within the machine line 100, still can be operated synchronously for moving the articles 104 through the machine line 100.

Although generally referred to as a servo motor, the servo motor of the present disclosure can be any motor with an associated controller for precise and controlled movements of the motor. For example, the servo motor can alternatively be referred to as a stepper motor or a rotary actuator or a rotary servo. Thus, the term servo motor is for descriptive purposes only and is not meant to be limiting to only devices referred to specifically as "servo motors."

Different servo motors can be used for different turrets depending on various factors. Such factors include, for example, the moment of inertia of the turret, the specific working operation of the turret (e.g., necking, flanging, and reforming modules all have different sizing requirements), and the stopping and starting times for rotating the turret and the machine line as a whole. Generally, the servo motor is selected such that the continuous power load that the servo motor is required to output within the machine line is about 80% of its total power load out.

Referring to FIG. 3B, the shaft 310 of the working turret 110 can extend into the servo motor 320a. This connection arrangement allows the shaft 310 to directly couple to the servo motor 320 itself, rather than coupling to the servo motor 320 via a rotor (not shown) extending from the servo motor 320. This direct coupling arrangement further reduces the backlash that is typically found when two objects mechanically couple. However, alternatively, the servo motor 320 can instead have a rotor (not shown) that extends out from the servo motor 320 and couples to the shaft 310.

As a further alternative, instead of directly coupling to the servo motor 320, the shaft 310 of the working turret 110 can instead be connected to or include an integrated gear (not shown) that meshes with a gear (not shown) that is connected to or integrated with a rotor (not shown) that extends from the servo motor 320. The geared connection between the shaft 310 of the working turret 110 and the servo motor 320 provides for a mechanical advantage between the working turret 110 and the servo motor 320. The mechanical advantage allows for the same servo motor type (e.g., power specifications, torque specifications, speed specifications, etc.) to be used for different working turrets and/or the different transfer turrets throughout the machine line 100, despite the different working turrets and/or the different transfer turrets having different power requirements, torque requirements, speed requirements, moments of inertia, etc.

Referring to FIG. 3C, the connection between the shaft 312 of the transfer turret 108 and the servo motor 320b can be the same type of connection as discussed above with respect to the servo motor 320 and the shaft 310 of the working turret 110, including the alternatives.

Figure 4:
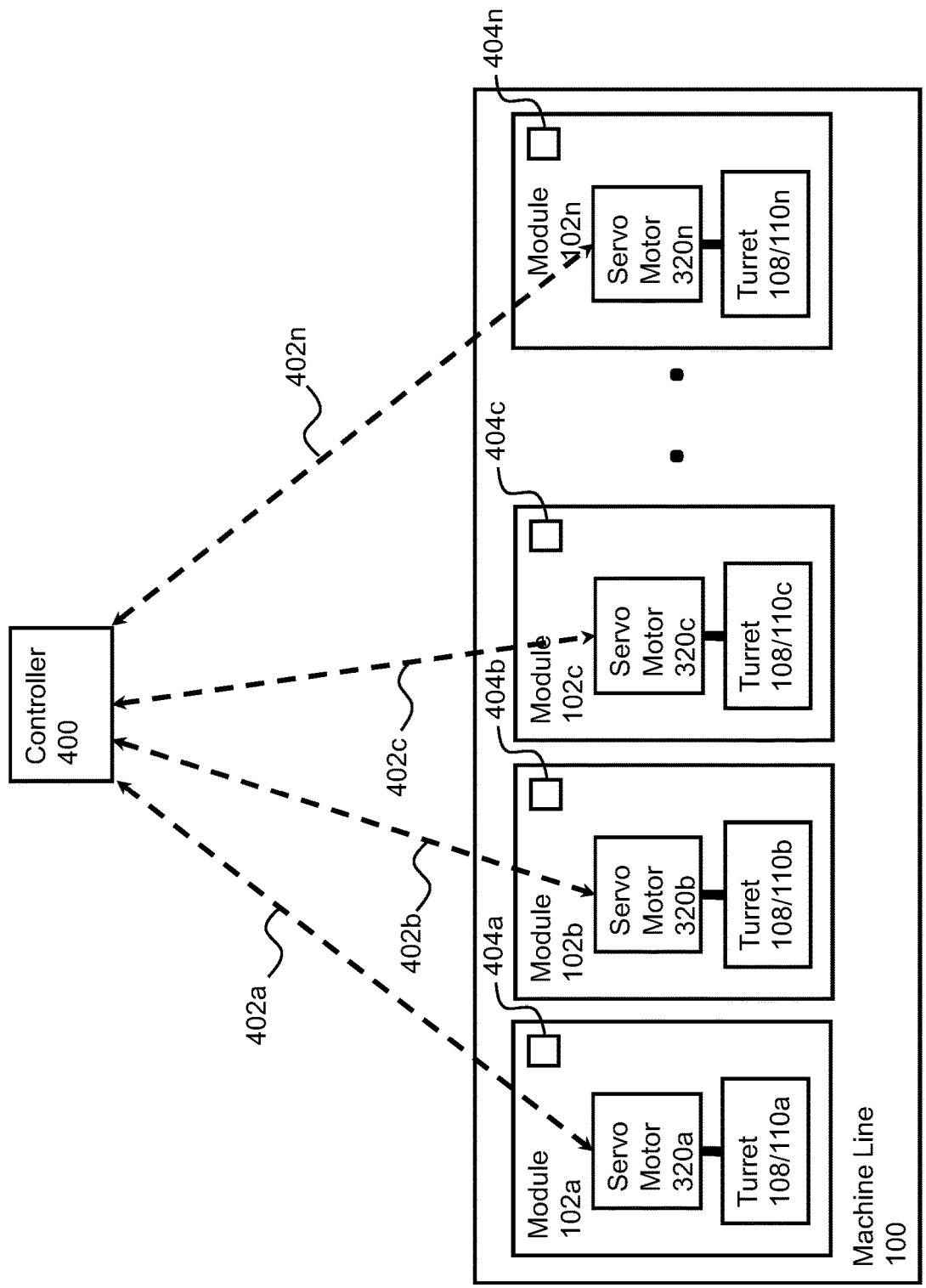
FIG. 4 shows a system view of the machine line of FIG. 1, according to aspects of the present disclosure.

FIG. 4 shows a system view of the machine line 100, including the series of modules 102a-102n, according to one non-limiting embodiment. Each module 102 includes at least one turret (e.g., transfer turret 108 and/or working turret 110) that is separately connected to a respective servo motor 320a-320n. Each servo motor 320 is in turn connected to a controller 400 for controlling operation of the servo motors 320. The controller 400 synchronously controls the servo motors 320 to rotate the transfer turrets 108 and the working turrets 110 for passing articles (articles 104, FIG. 1) through the machine line 100. Thus, the machine line 100 does not require the series of gears found in conventional machine lines, which extend through and connect to each of the modules 102, for rotating the transfer turrets 108 and working turrets 110.

According to one embodiment, and as shown in FIG. 4, the controller is connected to the series of servo motors 320a-320n via respective communication lines 402a-402n. Each communication line 402a-402n can be a single connection that transfers information between the controller 400 and the respective servo motors 320a-320n. Alternatively, each communication line 402a-402n can be a single connection that transfers information between the controller 400 and the respective servo motors 320a-320n and supplies the respective servo motors 320a-320n with power. Alternatively, each communication line 402a-402n can be two separate connections, one that transfers information between the controller 400 and the respective servo motors 320a-320n and one that supplies power to the respective servo motors 320a-320n. The communication lines 402a-402n can be wired or wireless, depending, for example, on their function.

Although FIG. 4 shows the controller 400 separately connected to each one of the servo motors 320 (e.g., 320a-320n), other communication connection arrangements are known to those skilled in the art that allow the controller 400 to communicate with each one of the servo motors 320. Thus, the illustrated communication connection arrangement is not meant to limit the disclosure to only the illustrated embodiment but encompasses all communication connection arrangements known in the art, such as multiplexed communication connection arrangements or the like.

The controller 400 can be a hardware, firmware, or software-based controller. For example, the controller 400 can have one or more processors that execute computer-readable instructions stored in memory within the controller 400 that causes the one or more processors to perform the methods and operations discussed herein. Similarly, each servo motor 320 can include one or more controllers (not shown) that are hardware, firmware, or software-based controllers that perform the operations and methods discussed herein with respect to the servo motors 320 in communication with the controller 400.

In one or more embodiments, each module 102a-102n can further include one or more sensors 404a-404n. The one or more sensors 404a-404n sense the articles 104 as they pass through the modules 102a-102n. The sensors 404a-404n can indicate if there is a jam in one of the modules 102a-102n based on sensing the lack of a can passing by the sensor for a specified period of time or a specified number of encoder ticks. For example, each of the modules 102a-102n can include two of the sensors 404a-404n, such as an infeed sensor and an outfeed sensor. If the infeed sensor 404 and/or the outfeed sensor 404 indicate different numbers of articles 104 for a specific period of time, or indicate more than a threshold number of encoder ticks without sensing an article 104, the infeed sensor 404 and/or the outfeed sensor 404 can provide a signal to the respective servo motors 320a-320n and/or the controller 400 for reporting a jam within the corresponding module 102a-102n. As discussed further below, the signals provided from the sensors 404a-404n can be used to verify the presence of an error condition detected by the servo motors 320a-320n.

FIG. 5 illustrates a process 500 of controlling the servo motors 320 within the machine line 100 with the controller 400, in accordance with aspects of the present disclosure. The steps of the process 500 can be performed by the controller 400, alone or in combination with respective controllers of the servo motors 320.

At step 502, the process 500 begins with the controller 400 operating the respective servo motors 320 within the modules 102. The controller 400 operates the servo motors 320 synchronously to cause the respective turrets 108 and 110 to rotate within the machine line 100 such that articles 104 pass through the machine line 100 as described above. As such, the turrets 108 and 110 perform the corresponding steps of passing articles 104 through the series of modules 102 and modifying a shape of the articles 104, respectively.

At step 504, the controller 400 detects an error condition within the series of modules 102. More specifically, the controller 400 receives a signal from a servo motor 320 when the servo motor 320 reports an error condition. In one or more embodiments, the error condition can be the servo motor 320 exceeding a torque threshold. The torque threshold can be a limit for the amount of torque expected for the servo motor 320 to apply in rotating the respective turret 108 or 110. The servo motor 320 exceeding the torque threshold may indicate an issue within the respective module 102, such as an article 104 being jammed within the corresponding module 102. Further, although described as coming from a single servo motor 320, the error condition can come from one or more of the servo motors 320 (e.g., one or more of servo motors 320a-320n). For example, two adjacent servo motors 320 may report an error condition if an article 104 becomes jammed between the two adjust servo motors 320. In which case, both of the jammed servo motors 320 can report an error condition. Multiple servo motors 320 can also report error conditions that are not adjacent to each other if, for example, multiple jams occur within the machine line 100 at about the same time.

Alternatively, the error condition can be the servo motor 320 exceeding a position threshold. For example, each servo motor 320 is expected to be at a specific position based on the control signals provided to the servo motor 320 from the controller 400. If the servo motor 320 deviates from the expected position by the position threshold, the servo motor 320 reports the position error condition. Such an error condition can indicate damage to an article and/or an article 104 being jammed within the corresponding module 102.

At step 506, the controller 400 stops the operation of the series of servo motors 320 within the series of modules 102 of the machine line 100 based on the detection of the error condition. The controller 400 stops the operation by stopping each servo motor 320 individually within the series of modules 102. Because the controller 400 can stop each servo motor 320 individually and consequently stop each corresponding turret 108 and 110 individually, independent of stopping the other servo motors 320, there is less backlash within the machine line as compared to conventional machine lines with modules connected by a series of gears. For example, stopping all of the turrets in conventional machine lines may take eight seconds or more because the action of the single motor stopping the entire series of gears linking the modules must propagate through the entire series of gears. Moreover, the additional gears themselves add momentum to the system that must be stopped to stop the respective turrets within the machine line. In contrast, stopping all of the turrets 108 and 110 by individually stopping the corresponding servo motors 320 of the machine line 100 of the present disclosure can take less than about 4 seconds, and more preferably less than about 2.5 seconds. The action to stop the corresponding turrets 108 and 110 is separately provided by each of the respective servo motors 320, which allows each servo motor 320 to stop its respective turret 108 or 110. For example, the controller 400 sends separate stop signals to each one of the servo motors 320 (e.g., servo motors 320a-320n) to stop rotating. The servo motors 320 simply need to stop their respective turret 108 or 110.

Upon the controller 400 stopping the operation of all of the servo motors 320 within the machine line 100, an operator can inspect the machine line 100 to determine if any action is required, such as clearing a jam or re-aligning one of the servo motors 320. Because the controller 400 receives an error condition from one or more servo motors 320, the controller 400 can also report the specific module 102 and the specific servo motor 320 that is involved in the error condition, which can simplify the inspection by the operator and reduce the required time for the inspection. By way of example, the controller 400 can provide information to the operator through one or more of the workstations 202 (FIG. 2) within the machine line 100, such as a workstation 202 that is specifically associated with the module 102 at issue. The operator can also use the controller 400 to place the module 102 at issue and/or the entire machine line 100 in a safe mode/state through the workstations 202 so that, for example, the operator can open a module guard cover 200 for the module 102 at issue for inspection.

In instances where the error condition itself was reported in error, such as in the case where there is no jam, the operator can simply restart the machine line 100 using the controller 400. However, in the event the error condition was correct such that further operator intervention is required, the machine line 100 of the present disclosure allows for a faster correction of the error, as described below, as compared to conventional machine lines. The faster correction of the error reduces the downtime of the machine line 100 which, when producing thousands of articles a minute, greatly increases the production rate for even short differences in downtime.

FIG. 6 illustrates a process 600 of correcting an error condition reported within the process 500 discussed above, in accordance with aspects of the present disclosure. The steps of the process 600 can be performed by the controller 400, alone or in combination with respective controllers of the servo motors 320.

Optionally, the process 600 can begin at step 602 with a verification of the error condition based on an encoder count associated with the module 102 corresponding to the servo motor 320 that reported the error condition. Specifically, as discussed above, the modules 102 within the machine line 100 include the sensors 404 that monitor for a specific number of encoder ticks or counts for each article 104 that passes through the respective module 102. In the event that the encoder counts exceed a threshold count without detecting an article 104 passing by one or more of the sensors 404, the respective sensor 404 can initiate an encoder count error. In combination with the machine line 100 of the present disclosure, the encoder count error can be used to verify the presence of the error condition discussed above with respect to the process 500. For example, the presence of an encoder count error can be used in combination with an error condition reported by a servo motor 320 to the controller 400 for validating the error condition reported by the servo motor 320. In the event there is no encoder count error, the error condition reported by the servo motor 320 by itself may be determined to be an error. In the event that there is both an encoder count error and an error condition, these determinations can be considered to validate one another to confirm the presence of an error condition. Alternatively, the error condition reported by the servo motor 320 can be used to verify the encoder count error and vice versa.

The controller 400 can perform the verification of the error condition using the encoder count upon receipt of the encoder count from a module 102. Alternatively, a servo motor 320 can perform the verification of the error condition using the encoder count and report the error condition to the controller 400 only after the error condition has been validated with the encoder count.

As at step 604, the controller 400 disables the respective servo motor 320 that reported the error condition. Disabling the servo motor allows an operator to manually rotate the corresponding turret 108/110 of the servo motor 320 for inspecting the turret 108/110 and removing any jam or correcting any position error associated with the turret 108/110. Because the turret 108/110 is not mechanically connected to the other turrets 108/110 within the machine line for the other modules, the turret 108/110 can be freely rotated by the operator without all of the turrets 108/110 having to rotate. This allows for expedited location and correction of the jam, unlike in conventional machine lines where the jam must be removed without being able to isolate the rotation of the involved turrets.

In the event the error condition is associated with a position threshold being exceeded, an operator can also make fine rotational adjustments to the associated turret 108/110. The adjustments allow for the turret 108/110 to be manually re-synced with the other turrets 108/110 within the machine line 100. Again, this is possible because the turret 108/110 is not mechanically synced with the other turrets 108/110 in the machine line 100 through a series of gears.

In one or more embodiments, a turret 108/110 associated with a servo motor 320 that reported an error condition may be in a hand-off state with one or more adjacent turrets 108/110. Such a hand-off state includes the condition of an article 104 being in the process of being handed off or in contact with two adjacent turrets 108/110, one of which is associated with the error condition. In the hand-off state, the article 104 being handed-off may prevent the two adjacent turrets from rotating freely relative to one another. Thus, the operator can remove any article(s) 104 being handed off that would otherwise prevent free rotation of the turrets. At the same time, the controller 400 can disable one or more adjacent servo motors 320 associated with the adjacent turrets 108/110 in the hand-off state to allow manual rotation of the corresponding turrets 108/110 of the one or more neighboring servo motors 320 separate from the other turrets. This provides the opportunity for an operator be able to rotate a turret to a desired area to more effectively remove a jam rather than being unable to directly access the area and instead rely on tools.

Prior to the controller 400 operating the servo motors 320, the servo motors 320 can be aligned amongst each other according to a virtual axis. Alignment with the virtual axis allows the servo motors 320 to synchronously operate with each other despite their rotations not being mechanically linked via gears. The absolute encoding with the virtual axis allows for the disabled servo motors to re-align once they are again enabled by the controller 400 despite being manually rotated, e.g., to correct an error condition.

In one or more embodiments, each servo motor 320 can be pre-configured to have a default alignment position. For example, the servo motor 320 can include information on the module 102 it will be associated with in the machine line 100 and/or information on the specific turret 108/110 that it will be connected (e.g., transfer or working turret, power requirements, rotational velocity, etc.). Thus, the default alignment position corresponds to a default virtual axis of the series of servo motors 320 within the machine line 100. This allows the servo motors 320 to automatically align without any manual alignment by an operator prior to initially operating the servo motors within the machine line 100.

At step 606, the controller re-aligns the one or more servo motors 320 that were disabled and manually rotated with the virtual axis after the error condition is corrected. For example, the operator can remove an article 104 causing a jam and thereafter indicate to the controller 400 that the error condition is corrected, which then causes the controller 400 to re-align the affected servo motors 320. The servo motors 320 can be absolute encoder servo motors, which allows the controller 400 to signal the servo motors 320 to return to their position prior to the servo motors 320 being disabled.

According to the above disclosure, with the servo motors individually controlling the turrets within the machine line, it is possible to disable and rotate a single turret within the machine line because all of the turrets are not mechanically synced with each other through a series of gears. There is also no or minimal backlash that occurs as compared to a conventional, gear-driven machine line when starting and stopping the turrets because the slack within a series of gears that needs to be taken up during the starting or the stopping of the turrets has been eliminated. The rotation of all of the turrets can be stopped more quickly because of the individual action from each respective servo motor and the reduction of weight that needs to be stopped because of the absence of the series of gears. Further, and as discussed above, the turrets of the present machine line can rotate freely with respect to one another because each turret is not connected to the series of turrets through the series of gears. Still further, the servo motors provide the ability to more accurately detect jams or other issues with the series of turrets and modules, as compared to conventional gear-driven machine lines, based on information sent from the servo motors. The lack of the series of gears also makes the module of the present machine line more modular in the sense that the modules do not need internal gears connected between adjacent modules. Thus, connecting the modules takes less time than conventional machine lines. The lack of gears also eliminates the need for gear boxes and oil baths in the bases of the modules to lubricate the gears. The lack of gear boxes opens up space in the bases of the modules for other functions, such as providing and routing vacuum lines for various turrets, or reduces the amount of floor space needed for the bases because they can be smaller. Improved vacuum routing because of the lack of gear boxes allows for smaller vacuum sources, which saves energy and cost. Accordingly, control of the turrets in the machine line of the present embodiment is more efficient and economical, for the reasons discussed above, than conventional machine lines.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the modules and/or machine line as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes, and omissions may also be made in the design, operating conditions, and arrangement of the various exemplary embodiments without departing from the scope of the present invention.

What is claimed is:

1. A method comprising:
    operating, by a controller, a series of servo motors synchronously within a series of modules, wherein each module of the series of modules includes a respective servo motor of the series of servo motors that rotates a corresponding turret for passing articles through the series of modules or for modifying a shape of the articles;
    detecting, by the controller, an error condition within the series of modules, the error condition being at least one servo motor of the series of servo motors exceeding a torque threshold, a position threshold, or a combination of the torque threshold and the position threshold, the error condition indicating damage to at least one of the articles, a jam of at least one of the articles in a corresponding turret of the at least one servo motor, or a combination thereof;
    stopping, by the controller, the operating of the series of servo motors within the series of modules based on the detecting of the error condition by stopping each servo motor individually within the series of modules; and
    verifying the error condition based on an encoder count associated with the module corresponding to the at least one servo motor exceeding a count threshold.

2. The method of claim 1, wherein the error condition is the jam of the at least one article, the method further comprising:
    disabling, by the controller, the at least one servo motor to allow manual rotation of the corresponding turret separate from the series of turrets for removing the jam of the at least one container.

3. The method of claim 2, further comprising:
    aligning the series of servo motors amongst each other according to a virtual axis prior to the operating of the series of servo motors; and
    re-aligning, by the controller, the at least one servo motor with the virtual axis after the removing of the at least one container.

4. The method of claim 2, further comprising:
    disabling, by the controller, one or more adjacent servo motors of the at least one servo motor to allow manual rotation of corresponding turrets of the one or more adjacent servo motors separate from the series of turrets.

5. The method of claim 4, further comprising:
    aligning the series of servo motors amongst each other according to a virtual axis prior to the operating of the series of the servo motors; and
    re-aligning, by the controller, the at least one servo motor and the one or more adjacent servo motors with the virtual axis after correcting the error condition.

6. The method of claim 1, wherein the controller performs the verifying of the error condition.

7. The method of claim 1, wherein a second controller performs the verifying of the error condition upon receipt of the error condition from the controller.

8. The method of claim 1, wherein the series of servo motors comes to a full stop in 4 seconds or less upon the stopping of the operating.

9. The method of claim 8, wherein the series of servo motors comes to a full stop in 2.5 seconds or less upon the stopping of the operating.

10. The method of claim 1, wherein each servo motor of the series of servo motors is coupled directly to the corresponding turret within the series of modules.

11. The method of claim 10, wherein a shaft of the corresponding turret is inserted into each servo motor to couple the servo motor to the respective corresponding turret.

12. The method of claim 1, wherein each servo motor of the series of servo motors is mechanically connected to the corresponding turret within the corresponding module by one or more gears, and the one or more gears of adjacent modules are mechanically isolated from each other.

13. The method of claim 1, wherein each servo motor of the series of servo motors is pre-configured to have a default alignment position, and the default alignment position corresponds to a default virtual axis of the series of servo motors within the series of modules.

14. The method of claim 1, wherein one or more turrets within the series of modules have different moments of inertia.

15. The method of claim 1, further comprising:
triggering a fault, by the at least one servo motor, when the error condition is the at least one servo motor exceeding the position threshold; and
re-setting, by the controller, the at least one servo motor to clear the fault after correcting the error condition.

16. The method of claim 15, further comprising:
after re-setting the at least one servo motor, returning the at least one servo motor to a rotational arrangement prior to the fault condition based on a virtual axis of the series of modules.

* * * * *